(12) United States Patent
Greenaae et al.

(10) Patent No.: US 8,595,093 B2
(45) Date of Patent: Nov. 26, 2013

(54) PROGRAM INTERFACE FOR A BUSINESS MANAGEMENT APPLICATION AND AN ACCOUNTING APPLICATION

(75) Inventors: Gregory Scott Greenaae, Kirkland, WA (US); Samir B. Manjure, Redmond, WA (US); Nicholas James Thomson, Redmond, WA (US); Srinivasan Parthasarathy, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 2114 days.

(21) Appl. No.: 10/988,938

(22) Filed: Nov. 15, 2004

(65) Prior Publication Data

US 2006/0106688 A1    May 18, 2006

(51) Int. Cl.
  *G07B 17/00* (2006.01)
  *G07F 19/00* (2006.01)
(52) U.S. Cl.
  USPC ............................................................ 705/30

(58) Field of Classification Search
  USPC ............................................................ 705/30
  See application file for complete search history.

(56) References Cited

U.S. PATENT DOCUMENTS

| | | | |
|---|---|---|---|
| 7,236,950 B2 * | 6/2007 | Savage et al. | 705/34 |
| 7,249,074 B1 * | 7/2007 | Land et al. | 705/34 |
| 2003/0182175 A1 * | 9/2003 | Buie et al. | 705/10 |
| 2004/0199541 A1 * | 10/2004 | Goldberg et al. | 707/104.1 |
| 2005/0278232 A1 * | 12/2005 | Bruffey et al. | 705/30 |

* cited by examiner

*Primary Examiner* — Paul Danneman
(74) *Attorney, Agent, or Firm* — Kelly, Molt & Christenson, PLLC (57) ABSTRACT

A program interface which provides access from a business management application to an accounting application to share account information. As described in illustrative embodiments, the system includes an interface module to instantiate and invoke an interface from the business management application to generate an accounting record from an opportunity or prospect record in the business management application. Thus, the accounting record is generated through the interface from the business management application to eliminate the need for duplicate data entry in the accounting application.

20 Claims, 7 Drawing Sheets

PROGRAM INTERFACE FOR A BUSINESS MANAGEMENT APPLICATION AND AN ACCOUNTING APPLICATION

BACKGROUND OF THE INVENTION

The present invention relates generally to an application or program interface and more particularly but not by limitation to an application or program interface for a business management application and an accounting application.

Business management applications, such as Business Contact Manager available from Microsoft, Inc. of Redmond Wash., allow a business person to track or manage business opportunities for client accounts. Typical features of the business management application allow a user to create business opportunity records or files in response to a business or sales inquiry. The opportunity record includes a description of the prospective business opportunity, such as for example, a goods/services description, quantity and price, etc. Once the prospect or opportunity record is created, the sales person can repeatedly reference the opportunity or prospect record to recall pertinent information for further discussion or interaction with the customer.

Customer accounting records such as sales records or invoices can be managed by a separate accounting application or program. Thus, once a prospect or opportunity record in the business management application becomes a sale or transaction, the previously entered prospect or opportunity information is re-entered into the accounting system for billing or accounting purposes. Entry or re-entry of the information into the accounting program or application by an accounting person or department increases complexity and demands on the accounting function or department, thereby reducing efficiency. The present invention addresses these and other problems and provides solutions not previously recognized nor appreciated.

SUMMARY OF THE INVENTION

The present invention provides a program interface or link between a business management application and an accounting application. The interface provides access from the business management application to the accounting application to share account information. As described in illustrative embodiments, the system includes an interface module to instantiate and invoke an interface from the business management application to generate an accounting record from an opportunity or prospect record in the business management application. Thus, the accounting record is generated through the interface from the business management application to eliminate the need for duplicate data entry in the accounting application.

BRIEF DESCRIPTION OF THE DRAWINGS

FIGS. 6-1 and 6-2 illustrate an embodiment of a graphical user interface to create prospect or opportunity records for a business account or customer in a business management application.

FIG. 6-3 illustrates a graphical user interface to invoke an interface to the accounting application to create an accounting record corresponding to the opportunity or prospect record in the business management application.

DETAILED DESCRIPTION OF ILLUSTRATIVE EMBODIMENTS

The present invention relates to converting opportunity records in a business management application to accounting records in an accounting application. However, before the invention is described in detail, one illustrative environment in which the invention can be used will be described.

Figure 1:
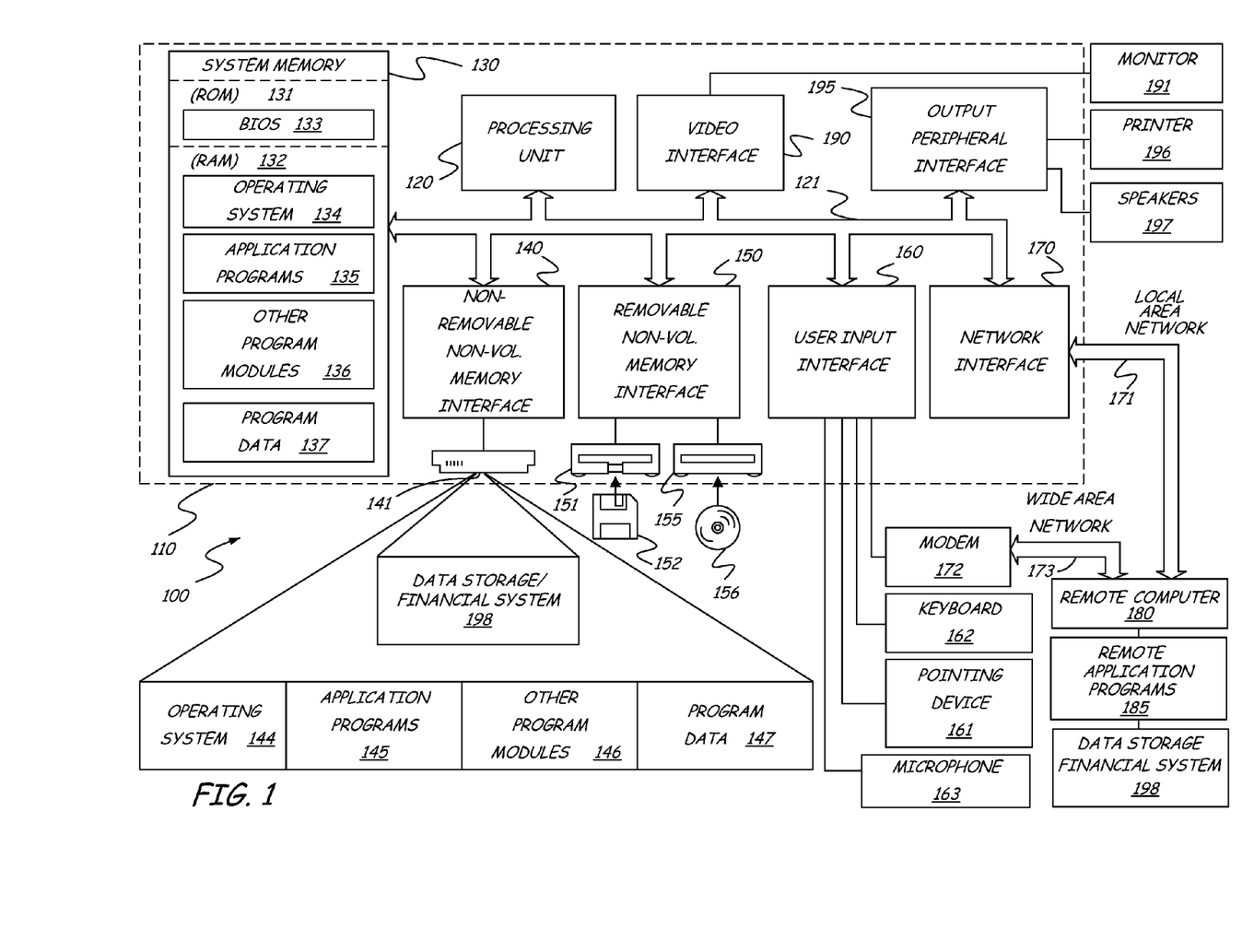
FIG. 1 is a block diagram of one illustrative environment in which the present invention can be used.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. Those skilled in the art can implement aspects of the present invention as instructions stored on computer readable media based on the description and figures provided herein.

The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data.

Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 100. Communication media typically embodies computer readable instructions, data structures, program modules or other data in a modulated data signal such as a carrier WAV or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, FR, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way o example, and not limitation, FIG. 1 illustrates operating system 134, application programs 135, other program modules 136, and program data 137.

The computer 110 may also include other removable/non-removable volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies.

A user may enter commands and information into the computer 110 through input devices such as a keyboard 162, a microphone 163, and a pointing device 161, such as a mouse, trackball or touch pad. Other input devices (not shown) may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computer 110 may operate in a networked environment using logical connections to one or more remote computers, such as a remote computer 180. The remote computer 180 may be a personal computer, a hand-held device, a server, a router, a network PC, a peer device or other common network node, and typically includes many or all of the elements described above relative to the computer 110. The logical connections depicted in FIG. 1 include a local area network (LAN) 171 and a wide area network (WAN) 173, but may also include other networks. Such networking environments are commonplace in offices, enterprise-wide computer networks, Intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user-input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on remote computer 180. It will be appreciated that the network connections shown are exemplary and other means of establishing a communications link between the computers may be used.

It should be noted that the present invention can be carried out on a computer system such as that described with respect to FIG. 1. However, the present invention can be carried out on a server, a computer devoted to message handling, or on a distributed system in which different portions of the present invention are carried out on different parts of the distributed computing system.

Figure 2:
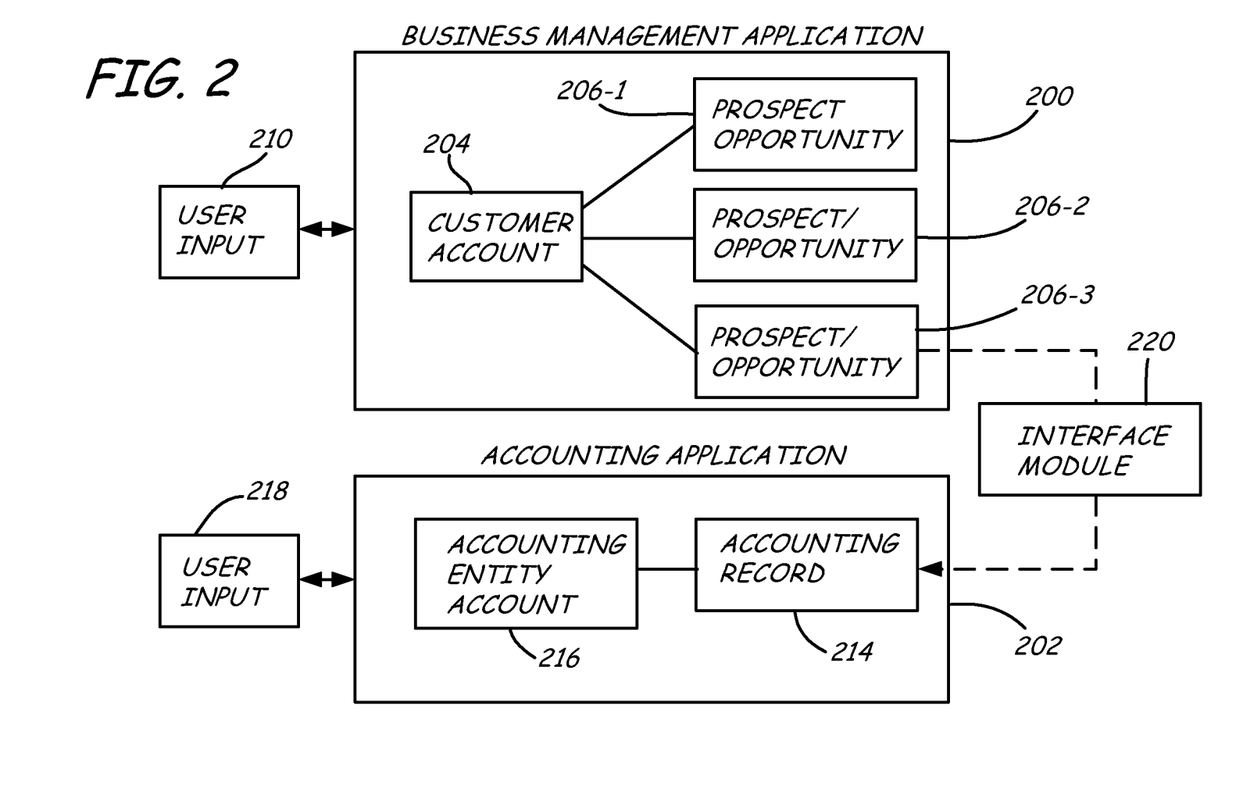
FIG. 2 is a schematic illustration of a business management application and accounting application.

The present invention relates to an interface between a business management application 200 and an accounting application 202 as schematically shown in FIG. 2 which is implementable on computer systems of the type illustrated in FIG. 1, or on other computers. In the embodiment illustrated in FIG. 2, the business management application 200 is configured so that the user is able to create customer accounts 204 to manage sales or business for a particular customer. For each customer, different prospect or opportunity records 206-1, 206-2, 206-3 can be created through user input 210 and the record stored in system memory or a data store.

The prospect or opportunity records 206-1, 206-2, 206-3 allow sales people to track or manage business opportunities or prospects. Opportunity or prospect information can be shared through a local or wide area network to allow multiple users or sales people access to the information to facilitate a sale or transaction. An example of such a business management application is "Business Contact Manager Application" BCM available through Microsoft Corp. of Redmond Wash. Of course, other business management applications or contact managers can be used as well and the one mentioned is only mentioned by way of example.

Accounting records or business transactions are managed through an accounting or transaction application or program 202, such as a Small Business Accounting application, available from Microsoft. Again, other accounting or transaction programs can be used and the one referenced is only one example.

Once the prospect or opportunity record 206-1, 206-2 or 206-3, becomes a business order or sales transaction, an accounting record 214 is created in the accounting application 202 for the customer's account or other accounting entity account 216. Thus, as described, information for a specific transaction is used in both the business management application 200 as an opportunity or prospect record 206 and in the accounting application 202 as an accounting transaction or record 214.

Previously, sales or business transactions were entered into the accounting application 202 through user input 218. However, in embodiments of the present invention, an interface module 220 invokes an interface to the accounting application 202 to convert a business opportunity or prospect record 206-3 in the business management application 200 to an accounting record 214 right from the business management application, thus eliminating additional data entry steps.

Figure 3:
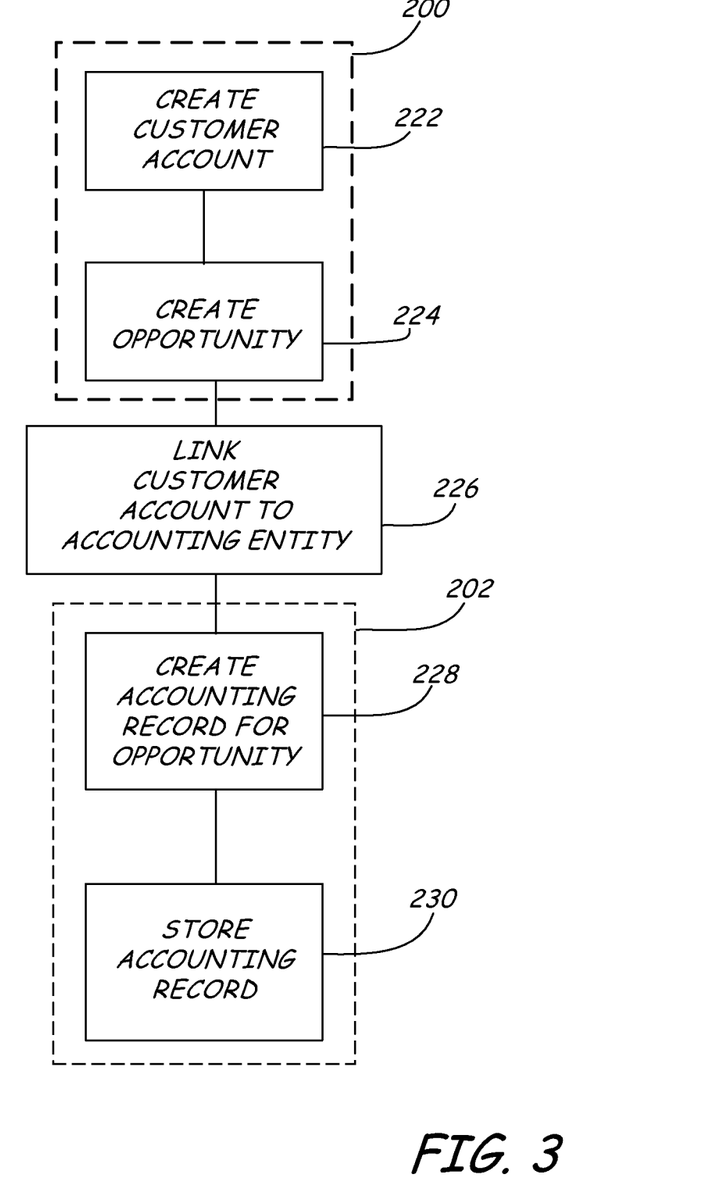
FIG. 3 is a flow diagram illustrating an embodiment of a conversion of an opportunity or prospect record in a business management application to an accounting record in an accounting application.

FIG. 3 illustrates a flow diagram of an embodiment for implementing the interface to create an accounting record 214 corresponding to an opportunity or prospect record 206 in the business management application 200. As previously described, a customer account 204 is created in the business management application 200 as illustrated by block 222. The customer account 204 is used to manage business opportunities for the particular customer. Once the customer account 204 is created, the user can create any number of prospect or opportunity records 206-1, 206-2, 206-3 for the customer account as illustrated by block 224.

As previously described, the business management application 200 interfaces with the accounting application 202 to share customer information. To interface, the customer account 204 in the business management application is linked to a corresponding accounting entity account 216 in the accounting application 202 as illustrated by block 226.

Thereafter, the system can invoke or instantiate an interface to the accounting application to generate or create the accounting record 214 for the customer or account from the opportunity or prospect record 206 in the business management application 200 as illustrated by block 228. The accounting record 214 is stored in memory or a database for access or retrieval as illustrated by block 230. Thus the accounting record 214 can be created for example from a sales or business person's desktop right from the business management application 200.

Figure 4:
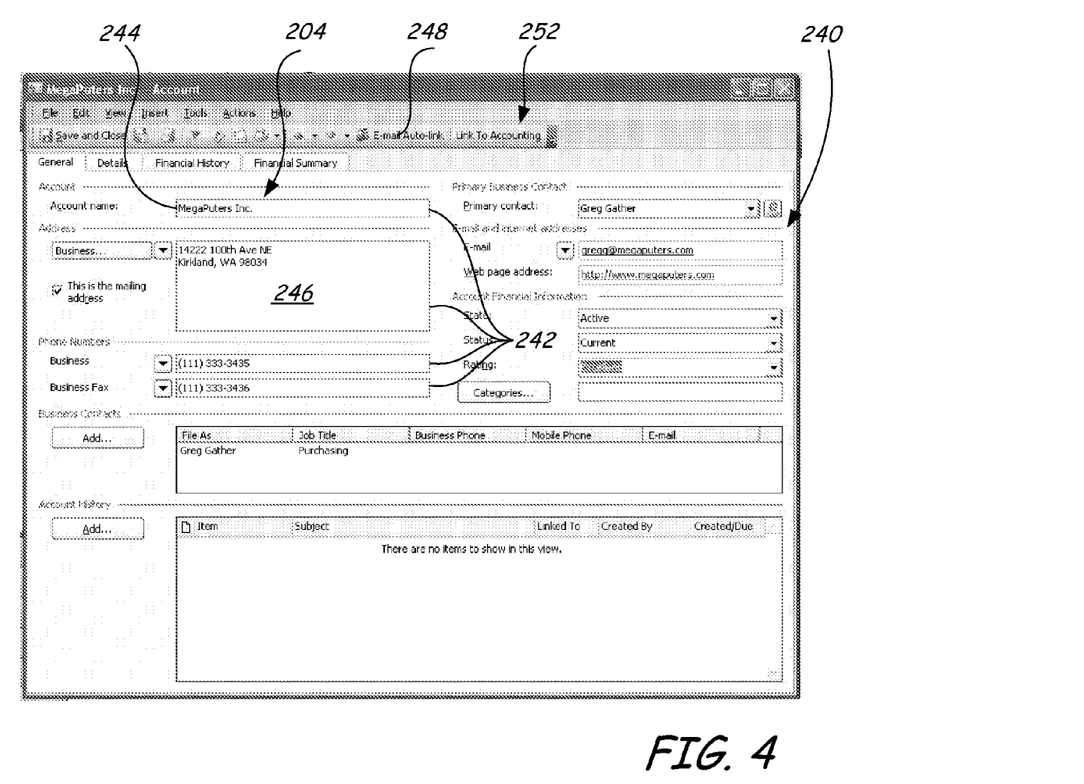
FIG. 4 is an embodiment of a graphical user interface for a business management application.

FIG. 4 illustrates an embodiment of a graphical user interface 240 for the business management application 200. The graphical user interface 240 shown illustrates a business management application function used to create a customer account 204 within the business management application 200. As shown, the graphical user interface 240 for creating the account includes a graphical display having data entry or text boxes 242 to input information for the customer, such as customer name 244 (e.g. MegaPuters, Inc.), address 246 and other customer or contact information as shown. Information is entered in different data entry or text boxes 242 using input devices such as a pointing device, keyboard device, microphone or other input devices as previously described.

Once entered, the customer account information is illustratively available to business management users through a network data store. As shown, the business management application 200 can operate within an electronic mail application or system or be linked to the electronic mail function through an "E-Mail Auto-link" option 248 accessible through the graphical user interface 240.

As previously described, the customer account 204 is linked to an accounting entity account 216 to interface with the accounting application 202. As shown in FIG. 4, this link is initiated by selecting "Link to Accounting" function 252 on the graphical user interface 240 in the business management application 200.

Figure 5:
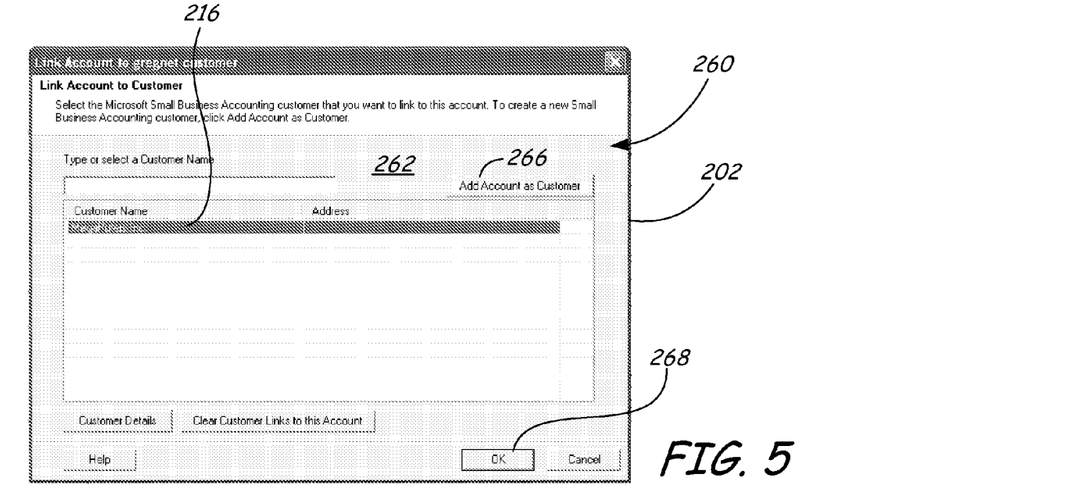
FIG. 5 is an embodiment of a graphical user interface to provide a link to an accounting entity customer or account.

The "Link to Accounting" function 252 invokes or instantiates an interface referred to as "Link Account to Customer" illustrated by numerical 260 shown in FIG. 5. As shown the "Link Account to Customer" function 260 displays a graphic user interface 262 to enter an accounting entity customer, account 216 to link to the business management account 204 to the accounting entity account 216. The accounting entity customer account 216 can be entered by selecting an existing accounting entity customer account 216 or by text entry of a new accounting entity customer account.

Following entry of the desired accounting entity customer account 216, the "Add Account as Customer" selection or option 266 on display 262 can be activated by the user. Once the desired accounting entity customer account is entered, the user can complete the link by selecting the "OK" selector or option 268.

Figure 61:
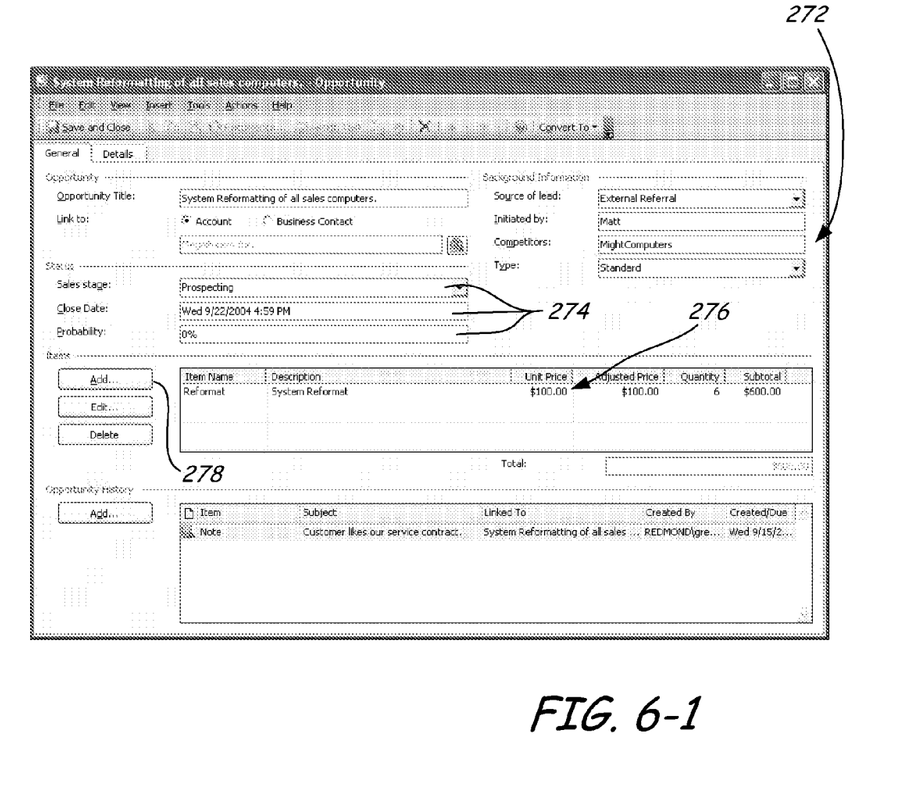

As previously described, once the customer account 204 is created in the business management application 200, various opportunity or prospect records 206 can be created for the particular customer account 204 by invoking or selecting an opportunity function of the business management application 200. In the embodiment illustrated in FIG. 6-1, the opportunity record 206 is represented by a graphic user interface 272 that is used to input information or data regarding the opportunity or prospect such as the product/service type/description, unit price, quantity and total/subtotal amount, among others.

Figure 62:
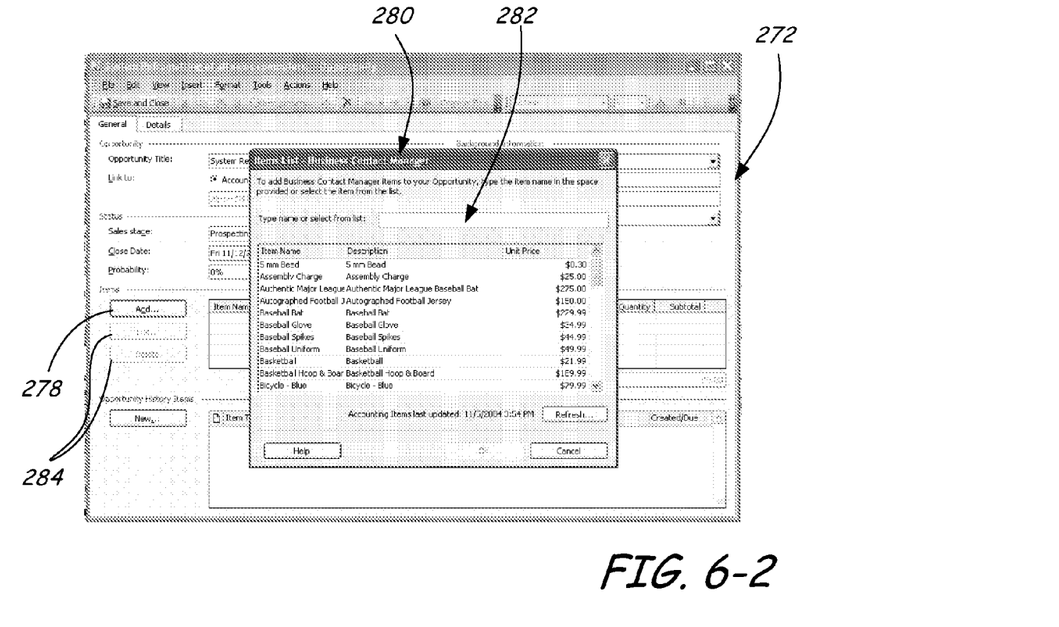

For example in an illustrated embodiment in FIG. 6-1, the graphical user interface 272 includes text entry boxes 274 to enter an opportunity title, status, contact or background information, and goods/services items 276. As illustrated in FIGS. 6-1 and 6-2, items 276 can be entered by choosing the "Add" option or selector 278 from the graphical user interface 272.

As shown in FIG. 6-2, the "Add" option 278 invokes an interface to the accounting application 202 to provide an item display list 280. As shown, a user can select a particular item on the list or enter an item in the text box 282 provided. The item list includes an item description and price that is automatically added to the opportunity record upon selection of the item from the item display list 280. Items can be added, edited or deleted by selecting the "Add" option 278 or the "Edit" and "Delete" options 284 from the graphical user interface display 272 as shown.

The opportunity or prospect record 206 facilitates management of potential business opportunities which can be shared or used by those on a sales team for future business development through a networked system. When the customer agrees to purchase the item or items 276 in the business opportunity record, the sale or transaction is recorded in the accounting application. As previously described in the present application, information from the prospect or opportunity record 206 can be converted to an accounting record 214 directly from the business management application 200.

Figure 63:
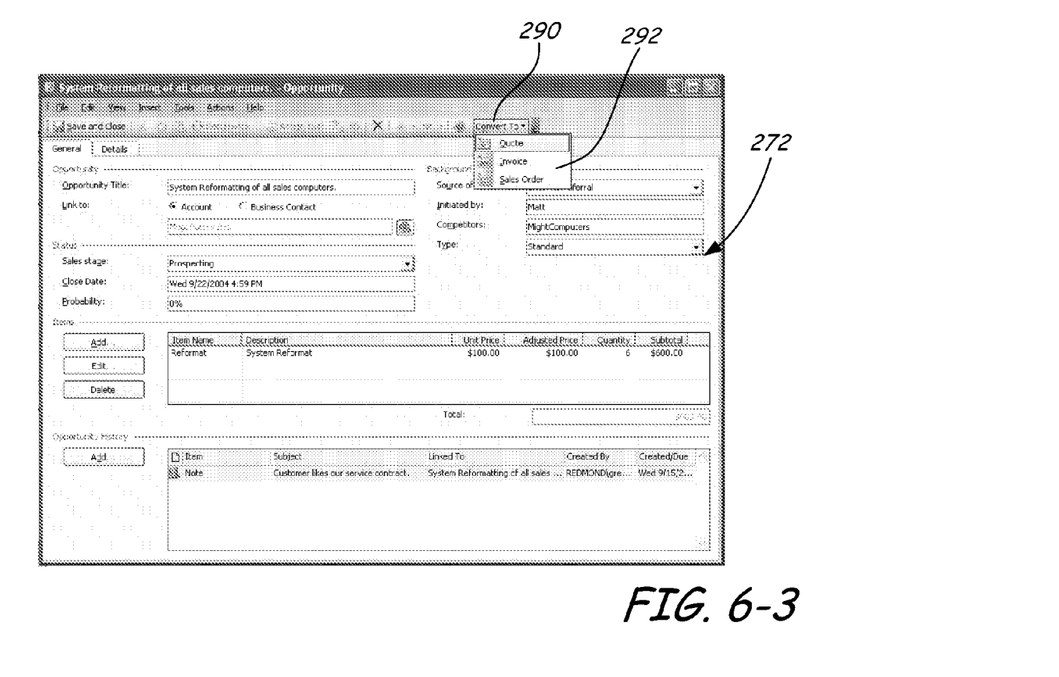

As shown in FIG. 6-3, the graphical user interface 272 for the opportunity function includes a "Convert to" drop down option or selection 290 for converting the opportunity to an accounting record 214. As shown, the "Convert to" option 290 includes a drop down menu 292 for selecting the desired account record. In the illustrated embodiment, drop down menu 292 includes selection options "Quote", "Invoice" or "Sales Order". The user selects the desired option through an input device, for example a pointing device, to initiate the conversion.

As previously described, selection of the conversion option invokes an interface to the accounting application 202 that takes data from the opportunity record 206 and converts the data from opportunity record into a "Quote", "Invoice" or "Sales Order" record in the other application (in this case the accounting application). In the embodiment previously illustrated, the conversion is performed via the interface module 220 (shown in FIG. 2) which includes executable code to share or duplicate the opportunity or prospect data into the accounting record to create and populate the accounting record from the business management application 200.

Figure 7:
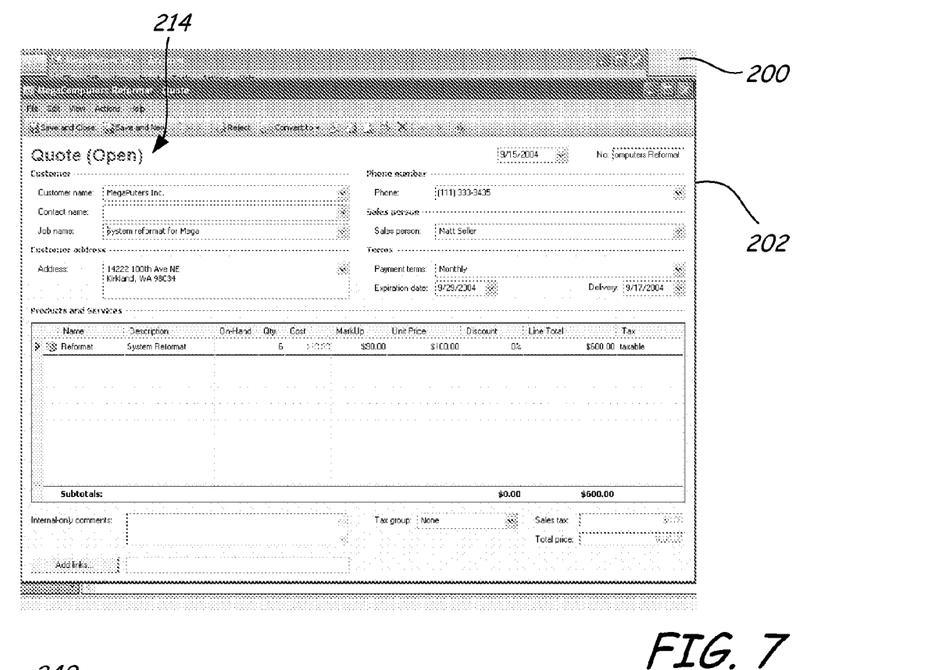
FIG. 7 is a graphical user interface display of the accounting record in the accounting application created from the prospect or opportunity record in the business management application.

As shown in FIG. 7, the accounting record 214 is displayed by the accounting application 202 following execution of the conversion. Thus as described, an accounting record 214 can be created right from the sales or business person's desktop using the opportunity record 206 from the business management application 200 to simplify office and sales procedures and eliminate additional data entry steps.

As described, accounting records 214 can be created from the business management application using data records from the business management application 200 to manage a customer account. Additionally as shown in FIG. 8, the account history or transactions 300 can be displayed from within the business management application 200 by invoking an interface to the accounting application 202 and accounting records therefor.

Figure 8:
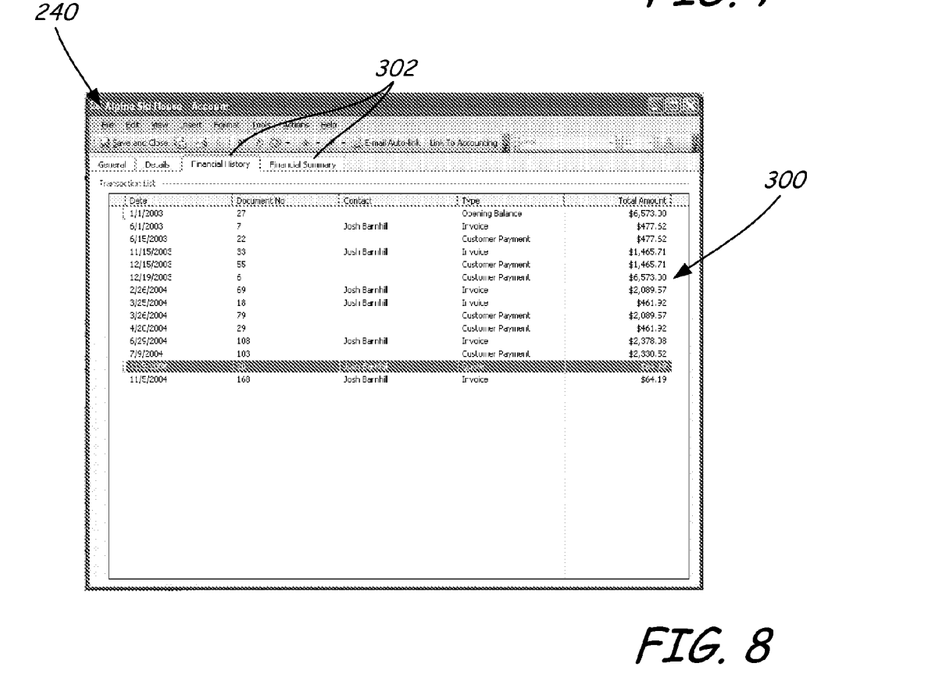
FIG. 8 is a graphical user interface for financial data for an accounting entity customer invoked from the business management application.

In particular, as shown in FIG. 8, the interface is invoked by selecting the "Financial History" or "Financial Summary" options 302 on the graphical user interface 240 to display accounting records for the customer or account. Thus the interfaces described, enhance use of the business management application 200 to enhance office efficiency.

Although the present invention has been described with reference to particular embodiments, workers skilled in the art will recognize that changes may be made in form and detail without departing from the spirit and scope of the invention.

What is claimed is:

1. A system, comprising:
a first application program including computer executable instructions stored on one or more computer storage devices and executable by a processing unit and the computer executable instructions of the first application program generating a graphical user interface for display on an electronic display device wherein the graphical user interface includes voice-activated input fields or boxes configured to receive voice input data for a business prospect or opportunity and the computer executable instructions of the first application program processing the voice input data and creating a business prospect or opportunity record utilizing the voice input data;
a second application program, separate from the first application program, including computer executable instructions stored on the one or more computer storage devices;
an interface component including computer executable instructions stored on the one or more computer storages devices, invoking an interface between the first application program and the second application program in response to selection of an icon or selector on the graphical user interface of the first application program and the interface component duplicating data from the first application program to the second application program to create an accounting record in the second application program using the voice input data from the business prospect or account record created by the first application program in response to the selection of the icon or selector, from within the first application program, without separate user entry of the voice input data in the second application program; and
a computer processor being a functional component of the system and activated by the interface component to facilitate invoking the interface between the first and second application programs and duplicating data.

2. The system of claim 1 wherein the first application program is a business management application and the business management application is activated within an electronic mail application.

3. The system of claim 1 wherein the business prospect or opportunity record includes one or more of customer name, customer address or customer contact information and one or more sales or product items.

4. The system of claim 1 wherein the voice input data for the business prospect or opportunity includes prospective customer data and including a "link to" function selectable through a "link to" icon on the graphical user interface and the "link to" function is configured to invoke the interface component to link a prospective customer in the first application program to an accounting customer in the second application program.

5. The system of claim 4 wherein in response to the selection of the link to" function the interface component instantiates and invokes the interface to the second application program to generate a new customer account in the second application program to link to the prospect customer in the first application program.

6. The system of claim 4 wherein the graphical user interface includes a financial summary or display selection and the interface component is configured to instantiate and invoke the interface to the second application program to retrieve financial information for the accounting customer in the second application program linked to the prospective customer in the first application program.

7. The system of claim 4 wherein in response to selection of the "link to" icon, the interface component is configured to invoke the interface to the second application program to share existing customer account data to provide a list of user selectable existing customer accounts to link to the prospective customer in the first application program.

8. The system of claim 1 wherein the voice input data includes sales or product information and the interface component is configured to instantiate and invoke the interface to the second application program to provide the sales or product information from the second application program to generate a user selectable list or menu of sales or product items.

9. The system of claim 8 wherein the list or menu of sales or product items include an item or product name, description and price.

10. The system of claim 1 wherein the icon or selector includes one or more of a "Quote", "Invoice" or "Sales Order" selection.

11. A method comprising:
receiving input data for a business prospect or opportunity in a business management application program from a touch-sensitive user input device;
processing the input data using a processing unit to create a business prospect or opportunity record and storing the business prospect or opportunity record on one or more computer storage devices;
receiving an input selection from the user input device, indicative of the user actuating an actuable icon on, using a touch gesture on the touch-sensitive user input device, a user interface display generated by the business management application program, to convert the business prospect or opportunity into an accounting record;
in response to user actuation of the actuable icon generated by the business management application, invoking an interface to an accounting application program from within the business management application program;
duplicating data from the business prospect or opportunity record of the business management application program to the accounting application program in response to invoking the interface from within the business management application program;
processing the duplicated data and generating the accounting record in the accounting application program, which is separate from the business management application program, for one or more transactions of the business prospect or opportunity without separate user entry of input data into the accounting application program, utilizing the duplicated data from the business prospect or opportunity record in the business management application program to populate data to the accounting record; and
storing the accounting record on the one or more computer storage devices.

12. The method of claim 11 wherein the accounting record is one of an "quote", "invoice" or "sales order".

13. The method of claim 11 and further comprising the step of:
opening a new window and displaying the accounting record on a display device.

14. The method of claim 11 and comprising the step of:
receiving an input selection, as a touch gesture on the touch-sensitive user input device, to link a prospective customer in the business management application program to an accounting customer in the accounting application program;
receiving input data for the accounting customer;
processing the input data for the accounting customer and generating a link between the prospective customer in the business management application program and the accounting customer utilizing the input data for the accounting customer; and
storing the link between the prospective customer in the business management application program and the accounting customer on the one or more data storage devices.

15. The method of claim 11 and comprising the step of:
retrieving a list of sale or product items from the accounting application program stored on the one or more computer storage devices;
displaying the list of sale or product items for user selection; and
using one or more selected sale or product items from the list of sale or product items to generate the business prospect or opportunity record.

16. An application interface between a first application program including computer executable instructions stored on one or more computer storage devices and a second application program separate from the first application program including computer executable instructions stored on the one or more computer storage devices comprising:
a graphical user interface generated by the first application program using the computer executable instructions stored on one or more computer storage devices and the graphical user interface including one or more voice data entry fields configured to receive voice inputs and input data for a business opportunity or prospect in the first application program to generate a business prospect or opportunity record and the graphical user interface including a user selectable convert icon or selector selectable using a voice command; and
an interface component invoked upon selection of the user selectable convert icon or selector from within the first application program and including computer executable instructions stored on the one or more computer storage devices to copy data of the business opportunity or prospect record into the second application program to generate one of a "quote", "invoice" or "sales order" record in the second application program for the opportunity or prospect in the first application program utilizing the copied data for the prospect or opportunity in the first application program.

17. The application interface of claim 16 wherein the opportunity or prospect in the first application program is displayed in a first window and the one of the "quote", "invoice" or "sales order" record is displayed in a second window.

18. The application interface of claim 16 wherein the selection of the user selectable convert icon or selector invokes a drop down menu including "Quote", "Invoice" and "Sales Order" selections.

19. The application interface of claim 16 wherein the one or more voice data entry fields to receive voice inputs and input the data for the business opportunity or prospect includes one or more of product/service type/description, price and quantity.

20. The application interface of claim 16 wherein the interface component is configured to invoke an interface to the second application program to retrieve product or sales information to display a menu or list including one or more user selectable product or sales items for the business opportunity or prospect.

* * * * *